Dec. 29, 1931.    T. ZERBI    1,838,895
ENGINE HOOD FOR MOTOR VEHICLES
Filed May 28, 1930
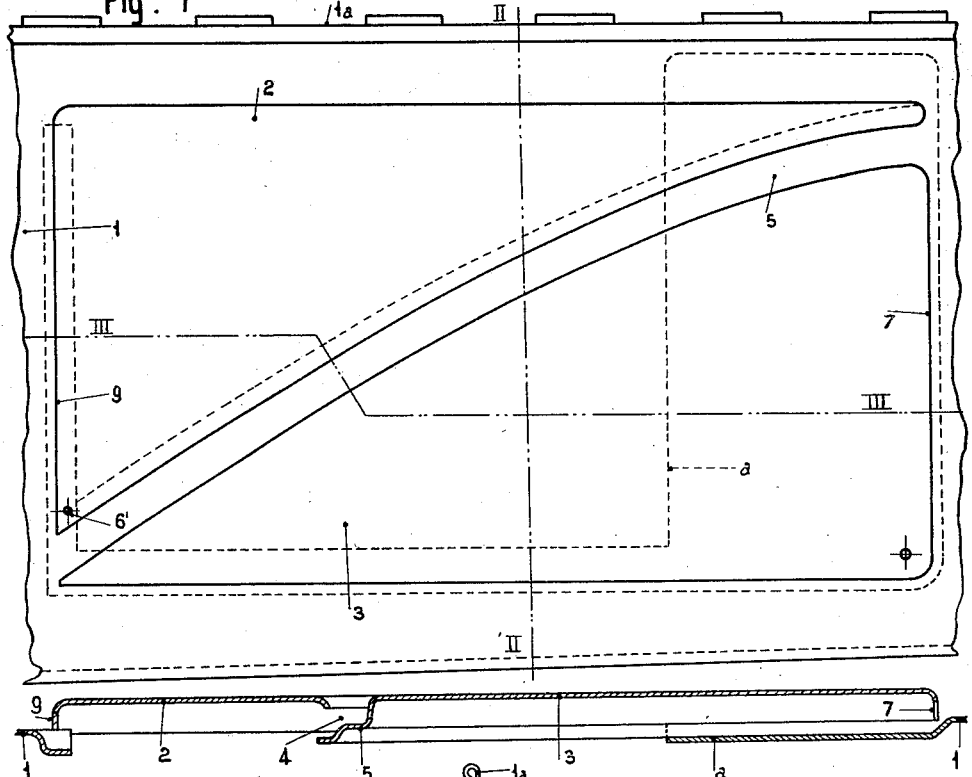
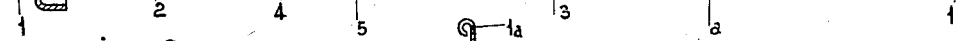
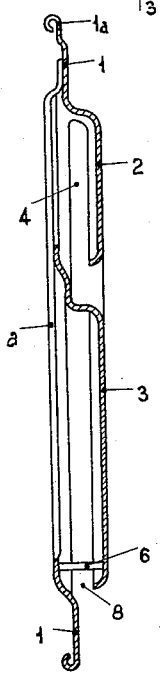

Patented Dec. 29, 1931

1,838,895

UNITED STATES PATENT OFFICE

TRANQUILLO ZERBI, OF TURIN, ITALY, ASSIGNOR TO FIAT SOCIETÁ ANONIMA, OF TURIN, ITALY

ENGINE HOOD FOR MOTOR VEHICLES

Application filed May 28, 1930, Serial No. 456,467, and in Italy January 29, 1930.

This invention relates to improvements in engine hoods for motor vehicles and its object is to provide a hood which shall be simpler in construction, more efficient as concerns air circulation and confers an improved appearance to the front portion of the vehicle.

It is known that engine hoods of motor vehicles are generally provided on their sides with a plurality of openings in order to ensure an efficient exchange of air about the engine enclosed in the hood. These openings consist of a plurality of shutter slits cut in the side walls of the engine hood and having different forms and directions.

According to this invention instead of a plurality of shutter openings as mentioned above, I cut on each side wall of the engine hood a diagonal slit which is conveniently curved and concealed and extends preferably from the upper front end to the rear lower end of the hood, i. e. exactly through the space generally occupied by a plurality of shutter openings.

The diagonal slit according to this invention may be obtained in various different manners. According to a preferred embodiment I obtain through suitable pressing and cutting operations on the hood sides two raised or embossed panels separated from each other by a diagonal strip along which the slit according to this invention is cut. These raised panels are provided with slits along their vertical edges and the lower panel may have an opening on its horizontal edge.

The panels end with rounded edges which perfectly conceal the slits cut along said edges without in the least affecting their efficiency as regards the exchange of air.

The accompanying drawings show by way of example a construction of the hood according to this invention.

Figure 1 is a side view.

Figure 2 is a section on line II—II of Fig. 1 and

Figure 3 is a section on line III—III of Fig. 1.

Referring to the drawings, the hood is pressed and cut from sheet metal and has on both its side walls a frame 1 hinged on its side 1a to the adjacent upper portion of the hood. In said frame are pressed out two raised panels 2 and 3 separated by a diagonal strip 5, situated on the same plane as the frame and provided with a shutter slit 4, wholly concealed between said strip and the upper panel 2.

The lower panel 3 is secured to the frame 1 along the strip 5 and by a distance bolt 6 at the lower corner of its front end. A front opening 7 is thus formed through which air enters the hood during movement of the motor vehicle and a lower opening 8 through which a part of the air having entered the hood flows to the outside after having cooled the engine.

The upper panel 2 is connected to the frame 1 along its horizontal upper edge and through the bolt 6' and has besides the above mentioned diagonal inlet slit 4 an outlet opening 9 on its rear vertical side. The diagonal strip 5 and the corresponding slit are indicated in this embodiment as slightly curved but they may be straight or have a different curvature.

Internally and in front of the frame 1 I may apply a protecting shield (not shown) to prevent cold air, rain, etc. from being thrown directly against the engine, this shield however not affecting or reducing the exchange of air.

The arrangement of the panels and the number of cuts and other constructional details may be varied from those described and shown on the accompanying drawings.

What I claim is:

In an engine hood for vehicles, a frame, two panels raised with respect to the plane of said frame, a strip extending diagonally from the lower end of the rear edge of the frame to the upper end of the front edge of said frame and separating said panels, said strip being connected with the upper edge of the lower panel and forming with the upper panel a slit extending perpendicularly to the plane of the frame, the front and lower edges of the lower panel and the rear edge of the upper panel forming slits extending perpendicularly to the plane of the frame.

In testimony that I claim the foregoing as my invention, I have signed my name.

TRANQUILLO ZERBI.